No. 796,542. PATENTED AUG. 8, 1905.
J. H. TYNES.
DETACHABLE WAGON SPINDLE.
APPLICATION FILED DEC. 21, 1904.
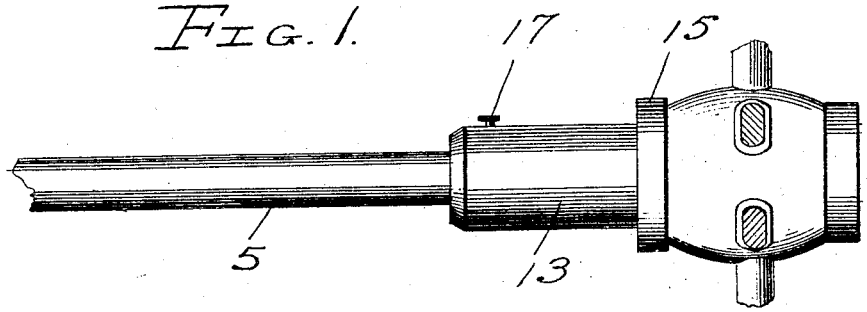
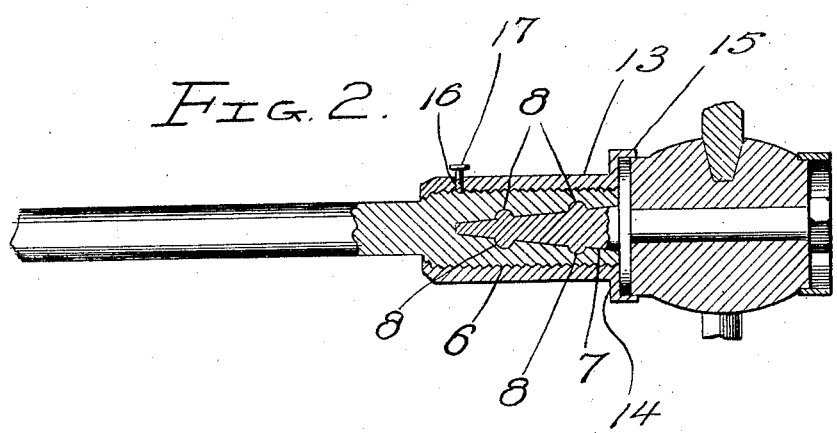
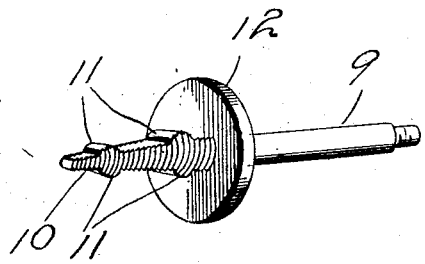
Witnesses
Inventor
J. H. Tynes
Attorneys

UNITED STATES PATENT OFFICE.

JOHN H. TYNES, OF SILLER, OKLAHOMA TERRITORY.

DETACHABLE WAGON-SPINDLE.

No. 796,542.  Specification of Letters Patent.  Patented Aug. 8, 1905.

Application filed December 21, 1904. Serial No. 237,821.

*To all whom it may concern:*

Be it known that I, JOHN H. TYNES, a citizen of the United States, residing at Siller, in the county of Pottawatomie, Territory of Oklahoma, have invented certain new and useful Improvements in Detachable Wagon-Spindles; and I do hereby declare the following to be a full, clear, and exact description of the invention, such as will enable others skilled in the art to which it appertains to make and use the same.

This invention relates to wagon-spindles, and more particularly to detachable spindles, and has for its object to provide a spindle of this kind which while being efficient will be extremely simple and which may be manufactured at a low figure.

Another object is to provide a spindle of this kind which will be equipped with a sand-band.

Other objects and advantages will be apparent from the following description, and it will be understood that modifications of the specific construction shown may be made and any suitable materials may be used without departing from the spirit of the invention.

In the drawings forming a portion of this specification like numerals of reference indicate similar parts in the several views.

Figure 1 is a view showing the present form of spindle in elevation and illustrating the hub of a wheel engaged therewith. Fig. 2 is a longitudinal section of Fig. 1. Fig. 3 is a detail perspective view of the spindle.

Referring now to the drawings, there is shown at 5 an axle forming a portion of the present invention, this axle having an enlarged exteriorly-threaded portion 6, provided with a V-shaped slot 7 in its outer end. Formed in the sides of the V-shaped slot are notches 8, the notches at one side coinciding with those of the other. As shown, the major end of the V-shaped slot lies at the outer end of the head 6.

A spindle 9 is provided having a shank 10 at one end, and this shank is beveled toward its free end to fit within the V-shaped slot 7, the shank being provided with transverse ribs 11 upon its beveled faces, which when the shank is in the slot 7 lie in the notches 8. The shank 10 is equal in width to the diameter of the head 6, and the edges of the shank are curved to conform to the curvature of the head, these side edges being provided with threads which form continuations of the threads of the head. At its inner end the spindle is provided with a laterally-extending circular flange 12. An interiorly-threaded sleeve 13 is provided which is of a size to receive the head 6 therewithin, and this sleeve has a laterally-extending flange 14 at one end, this flange being provided with a second flange 15, extending outwardly therefrom and at right angles thereto at its periphery, the inclosure of the flange 15 being of a size to receive the flange 12 therewithin and being in width somewhat greater than the thickness of the flange 12.

In assembling the parts the sleeve 13 is engaged with the head 6 and is screwed inwardly thereover until it projects some distance beyond the inner end thereof or, in other words, until the flanged end of the sleeve lies some distance from the outer end of the head 6. The shank 10 is then inserted in the slot 7, after which the sleeve is screwed toward the outer end of the head, which clamps the portion of the head at the sides of the slot 7 against the shank 10 to prevent withdrawal thereof. When in this position, the flange 12 lies within the inclosure of the flange 15, the latter projecting beyond the flange 12 to form a sand-band, as shown. The sleeve 13 is provided with a threaded perforation 16, in which there is engaged a set-screw 17 for operation to bear against the head 6, and by means of this set-screw the sleeve may be prevented from accidental disengagement from the head. The sleeve 13 is angular in cross-section to present a suitable grip for a wrench or a similar implement.

What is claimed is—

The combination with an axle having a threaded end and having a longitudinal slot in its threaded portion opening through the outer end thereof, said slot having transverse notches in its sides, of a spindle having a shank disposed within the slot and having ribs engaged in the notches, the side edges of the shank being curved to conform to the curvature of the axle and having threads corresponding to the threads of the axle, a flange carried by the spindle at the fixed end of the shank, an interiorly-threaded sleeve engaged with the threads of the axle and shank, said sleeve having a flange inclosing and extending beyond the first-mentioned flange and arranged for the reception of the end of the hub therewithin, and means for holding the sleeve against accidental disengagement from the threads.

In testimony whereof I affix my signature in presence of two witnesses.

JOHN H. TYNES.

Witnesses:
S. S. LARIMER,
A. L. JOHNSON.